(12) United States Patent
You et al.

(10) Patent No.: US 9,608,240 B2
(45) Date of Patent: Mar. 28, 2017

(54) RECHARGEABLE BATTERY

(71) Applicant: SAMSUNG SDI CO., LTD., Yongin-si, Gyeonggi-do (KR)

(72) Inventors: Tai-Sun You, Yongin-si (KR); Yong-Sam Kim, Yongin-si (KR); Jang-Hyun Song, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 521 days.

(21) Appl. No.: 14/174,088

(22) Filed: Feb. 6, 2014

(65) Prior Publication Data

US 2015/0030917 A1 Jan. 29, 2015

Related U.S. Application Data

(60) Provisional application No. 61/858,816, filed on Jul. 26, 2013.

(51) Int. Cl.
*H01M 2/08* (2006.01)
*H01M 2/02* (2006.01)
*H01M 2/04* (2006.01)

(52) U.S. Cl.
CPC ......... *H01M 2/0237* (2013.01); *H01M 2/043* (2013.01); *H01M 2/0439* (2013.01); *H01M 2220/20* (2013.01)

(58) Field of Classification Search
CPC .... H01M 2/02; H01M 2/0237; H01M 2/0245; H01M 2/0247; H01M 2/04;
(Continued)

(56) References Cited

U.S. PATENT DOCUMENTS 6,627,348 B1 * 9/2003 Haraguchi .......... H01M 2/0207
429/171
8,551,649 B2 * 10/2013 Suzuki ................ H01M 2/0237
429/163
(Continued)

FOREIGN PATENT DOCUMENTS

EP 1043784 A1 10/2000
JP 2011-181215 A 9/2011
(Continued)

OTHER PUBLICATIONS

European Office Action dated Dec. 1, 2014.

*Primary Examiner* — Eli Mekhlin
(74) *Attorney, Agent, or Firm* — Lee & Morse, P.C.

(57) ABSTRACT

A battery includes a case accommodating an electrode assembly, the case including an opening at one end and including at least one sidewall, the sidewall having a coupling portion adjacent to the opening, a cap plate that closes the opening, the cap plate having an upper surface, the coupling portion of the sidewall connecting the cap plate to the case, the coupling portion including a top surface of the sidewall, the cap plate overlying a first portion of the top surface of the sidewall, such that the upper surface of the cap plate is entirely above top surface of the sidewall, and a welding bead contacting the cap plate and a second portion of the top surface of the sidewall, the second portion of the top surface being between the first portion and an outer surface of the sidewall.

18 Claims, 9 Drawing Sheets (58) Field of Classification Search
CPC .. H01M 2/043; H01M 2/0434; H01M 2/0439; H01M 2/0473; H01M 2/0426
See application file for complete search history.

(56) References Cited

U.S. PATENT DOCUMENTS

| | | | | |
|---|---|---|---|---|
| 2006/0240320 A1* | 10/2006 | Cheon | ............... | H01M 2/0434 429/175 |
| 2010/0190053 A1* | 7/2010 | Suzuki | ............... | H01M 2/0473 429/185 |
| 2010/0233521 A1* | 9/2010 | Byun | ............... | H01M 2/263 429/72 |

FOREIGN PATENT DOCUMENTS

| KR | 10-2006-0027275 A | 3/2006 |
|---|---|---|
| KR | 10-2006-0112034 A | 10/2006 |

* cited by examiner

RECHARGEABLE BATTERY

CROSS-REFERENCE TO RELATED APPLICATION

The present application claims priority under 35 U.S.C. §119 to U.S. Provisional Application No. 61/858,816, filed on Jul. 26, 2013, and entitled: "Rechargeable Battery," which is incorporated herein by reference in its entirety.

BACKGROUND

1. Field

Embodiments relate generally to a rechargeable battery.

2. Description of the Related Art

A rechargeable battery can be repeatedly charged and discharged, unlike a primary battery, which is incapable of being recharged. A low-capacity rechargeable battery may be used for a small portable electronic device such as a mobile phone, a laptop computer, and a camcorder. A large-capacity rechargeable battery may be used as a power supply for driving a motor of a hybrid vehicle and the like.

Recently, a high-output rechargeable battery using a non-aqueous electrolyte of high energy density has been developed. A plurality of high-output rechargeable batteries may be connected in series to constitute a large-capacity battery module so as to be used for driving a motor of a device, e.g., an electric automobile or the like, that requires much power.

Also, a single high-output rechargeable battery may be formed of a plurality of rechargeable battery coupled to each other in series. The rechargeable battery may have a cylindrical shape or a prismatic shape.

SUMMARY

Embodiments are directed to a battery including a case accommodating an electrode assembly, the case including an opening at one end and including at least one sidewall, the sidewall having a coupling portion adjacent to the opening, a cap plate that closes the opening, the cap plate having an upper surface, the coupling portion of the sidewall connecting the cap plate to the case, the coupling portion including a top surface of the sidewall, the cap plate overlying a first portion of the top surface of the sidewall, such that the upper surface of the cap plate is entirely above top surface of the sidewall, and a welding bead contacting the cap plate and a second portion of the top surface of the sidewall, the second portion of the top surface being between the first portion and an outer surface of the sidewall.

The welding bead may be entirely within the second portion of the top surface of the sidewall.

A width of second portion of the top surface in a thickness direction of the sidewall may be about 0.6 times a total width of the top surface.

The cap plate may further include a protruding portion that protrudes into the opening of the case.

The protruding portion may include a side surface that contacts an inner surface of the sidewall.

The second portion of the top surface of the sidewall may include a groove. The welding bead may fill the groove.

The cap plate may include an end surface forming a non-oblique angle relative to the top surface of the sidewall and extending between at least the top surface of the sidewall and the upper surface of the cap plate, such that the end surface defines a niche, the niche extending along a side of the opening. The niche may receive and contain the welding bead.

The end surface of the cap plate may be perpendicular to the top surface of the sidewall.

The end surface may be a first end surface and may be parallel to a short side of the case. The cap plate may further include a second end surface that is parallel to a long side of the case.

The sidewall may include a plurality of sidewalls providing a plurality of top surfaces surrounding the opening, first portions of the top surfaces defining an innermost perimeter of the top surfaces and second portions of the top surfaces defining an outermost perimeter of the top surfaces. The cap plate may cover the innermost perimeter defined by the top surfaces surrounding the opening. The end surface of the cap plate may include a plurality of end surfaces each extending perpendicularly to the top surface of a respective sidewall at least between the top surface of the respective sidewall and the upper surface of the cap plate, such that the end surfaces define the niche that receives and contains the welding bead, the niche extending around the opening.

The case may have a prismatic shape defining a length direction, a width direction, and a height direction. The plurality of sidewalls may include short sidewalls facing each other and extending in the width and height directions and long sidewalls facing each other and extending in the length and height directions, such that the opening has a rectangular shape in the length and width directions, the short sidewalls having short sidewall top surfaces and the long sidewalls having long sidewall top surfaces. The cap plate may have a rectangular shape in the length and width directions and may partially cover the short sidewall top surfaces and the long sidewall top surfaces.

A length of the cap plate may be less than a length of the case. The length of the cap plate may be greater than a length of the opening. A width of the cap plate may be less than a width of the case. The width of the cap plate may be greater than a width of the opening.

A width of the short sidewall top surfaces in a thickness direction of the short sidewalls may be equal to a width of the long sidewall top surfaces in a thickness direction of the long sidewalls. A width of the second portion of the short sidewall top surfaces in the thickness direction of the short sidewalls may be greater than a width of second portion of the long sidewall top surfaces in the thickness direction of the long sidewalls.

The width of the second portion of the short sidewall top surfaces in a thickness direction of the short sidewalls may be about 0.7 to about 0.9 times a total width of the short sidewall top surfaces. A width of the second portion of the long sidewall top surfaces in a thickness direction of the long sidewalls may be about 0.6 times a total width of the long sidewall top surfaces.

The cap plate may include short end surfaces extending perpendicularly to the short sidewall top surfaces between at least the short sidewall top surface and the upper surface of the cap plate and long end surfaces extending perpendicularly to the long sidewall top surfaces between at least the long sidewall top surface and the upper surface of the cap plate.

The second portions of the top surfaces of the short sidewalls may include a groove extending in the width direction of the case. The welding bead may fill the groove.

The cap plate may further include a protruding portion that protrudes into the opening of the case, the protruding portion having a rectangular shape in the length and width directions.

The protruding portion may include side surfaces. A length of the protruding portion may be about equal to a length of the opening. A width of the protruding portion may be about equal to a width of the opening, such that the side surfaces of the protruding portion tightly contact inner surfaces of the short sidewalls and the long sidewalls.

The battery may further include positive and negative terminals electrically connected to the electrode assembly and extending to the exterior of the battery through the cap plate.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Figure 1:
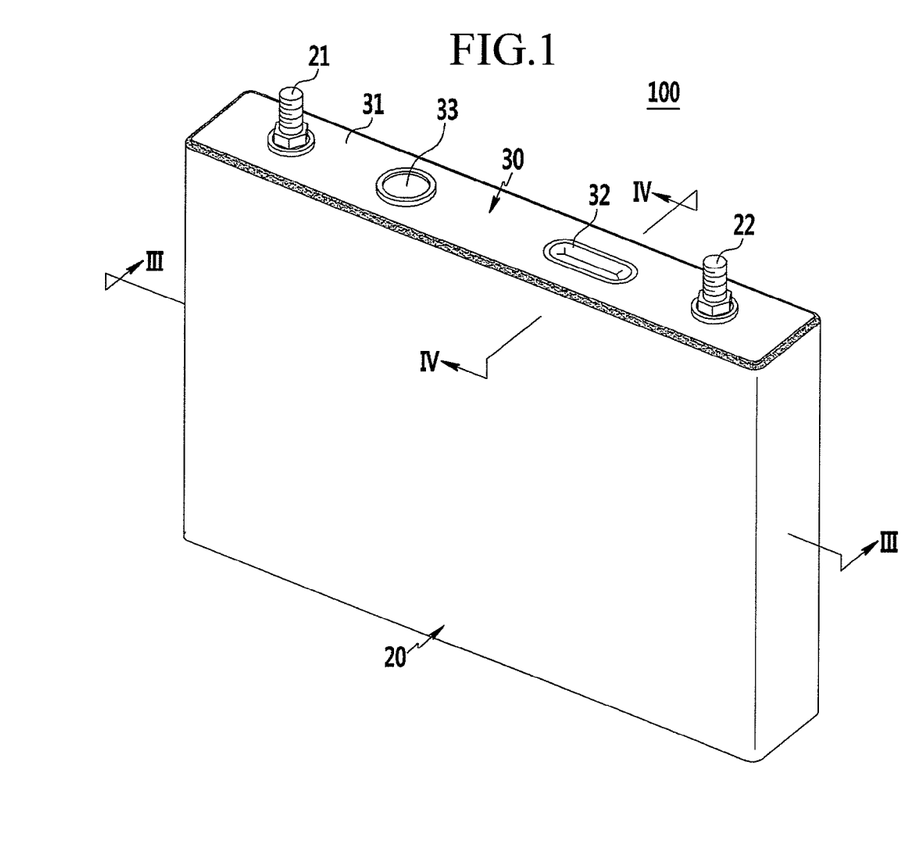
FIG. 1 illustrates a perspective view of a rechargeable battery according to an exemplary embodiment.
Figure 2:
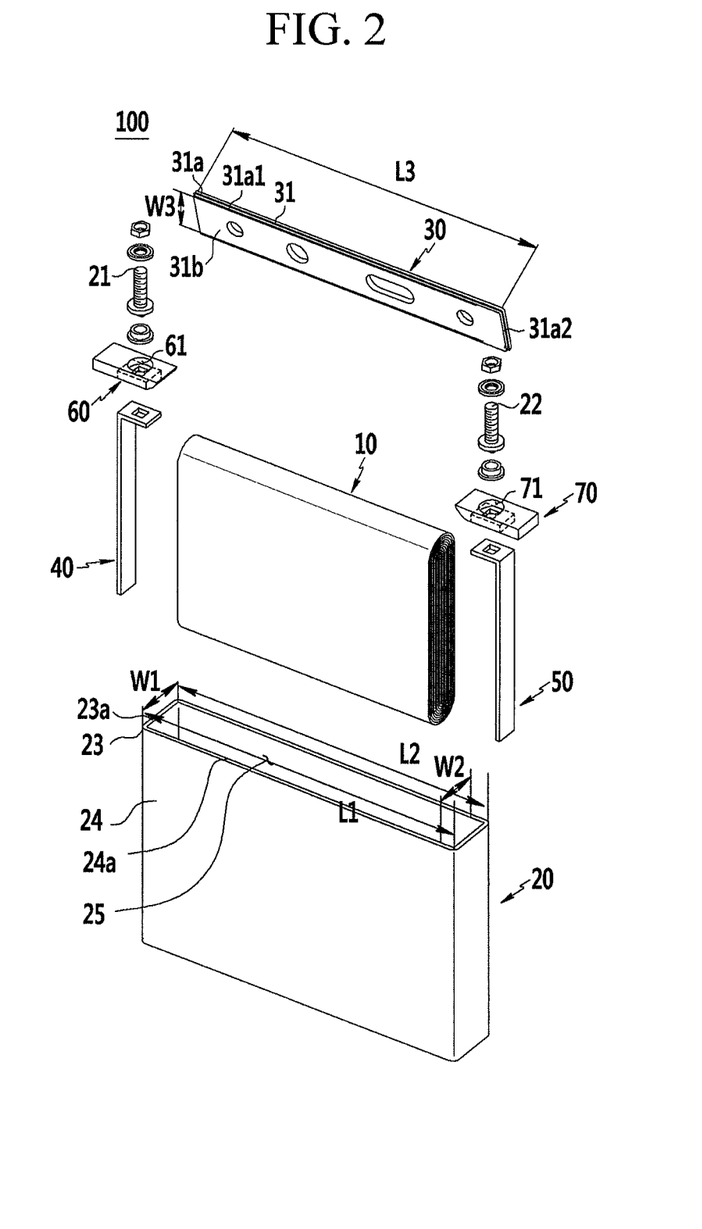
FIG. 2 illustrates s an exploded perspective view of the rechargeable battery of FIG. 1.

FIG. 1 illustrates a perspective view of a rechargeable battery according to an exemplary embodiment and FIG. 2 illustrates an exploded perspective view of the rechargeable battery of FIG. 1.

Referring to FIG. 1 and FIG. 2, a rechargeable battery 100 according to the present exemplary embodiment may include an electrode assembly 10, a case 20 in which the electrode assembly 10 is installed, and a cap assembly 30 coupled to an opening of the case 20.

In the present exemplary embodiment, the rechargeable battery 100 may be a lithium ion rechargeable battery formed in the shape of a prism. In other implementations, the rechargeable battery 100 may be a lithium polymer battery, a cylindrical battery, or the like.

The case 20 according to the present exemplary embodiment may form an entire exterior of the rechargeable battery 100 and may be made of a conductive metal such as aluminum, an aluminum alloy, or nickel-plated steel.

In addition, positive and negative terminals 21 and 22 according to the present exemplary embodiment may be electrically connected with current collectors including first and second current collectors 40 and 50. The first current collector 40 will be referred to herein as a positive current collector and the second current collector 50 will be referred to herein as a negative current collector.

For example, the positive and negative electrodes 21 and 22 may be coupled with the positive and negative current collectors 40 and 50 by welding. In other implementations, the positive and negative terminals 21 and 22 and the positive and negative current collectors 40 and 50 may be integrally formed.

In addition, an insulation member may be provided between the electrode assembly 10 and the cap plate 31. The insulation member may include first and second lower insulation members 60 and 70, which may be respectively provided between the electrode assembly 10 and the cap plate 31.

In addition, the positive terminal 21 and the negative terminal 22 may be fixed to the first lower insulation member 60 and the second lower insulation 70 by being inserted to through holes 61 and 71 respectively formed in the first and second lower insulation members 60 and 70.

The case 20 according to the present exemplary embodiment may be formed in the shape of a prism, and may include a pair of first side surfaces or sidewalls 23 facing each other and a pair of second side surfaces or sidewalls 24 connecting the pair of first sidewalls 24 and facing each other.

The first sidewalls 23 and the second sidewalls 24 of the case 20 according to the present exemplary embodiment may respectively include a first coupling portion 23a and a second coupling portion 24a to which the cap plate 31 is coupled.

The cap assembly 30 according to the present exemplary embodiment may include a cap plate 31 covering the opening 25 of the case 20, a vent portion 32 where a notch is formed, and an electrolyte injection opening 33.

In addition, the cap plate 31 according to the present exemplary embodiment may include a first plate 31a and a protruding portion 31b.

Here, the protruding portion 31b of the cap plate 31 according to the present exemplary embodiment may protrude along a length or width direction of the first plate 31a.

In addition, in the present exemplary embodiment, a length L3 and a width W3 of the first plate 31a may be formed smaller than a length L1 and a width W1 of the case 20 and formed larger than a length L2 and a width W2 of the opening 25 of the case 20.

The length and the width of the protruding portion 31b of the cap plate 31 according to the present exemplary embodiment may be substantially equivalent to the length L2 and the width W2 of the opening 25 of the case 20.

The protruding portion 31b of the cap plate 31 may be tightly fitted into the opening 25 of the case 20. The upper surface of the cap plate may be entirely above the top surface of the first sidewalls 23 and the second sidewalls 24.

According to the present exemplary embodiment, the protruding portion 31b of the cap plate 31 may be tightly fitted to the opening 25 of case 20 so that sealing property of the opening 25 may be improved and coupling strength between the cap plate 31 and the case 20 may be increased.

In addition, the cap plate 31a according to the present exemplary embodiment may be coupled to an inlet portion of the opening 25 of the case 20.

The first plate 31a according to the present exemplary embodiment may be formed in the shape of a quadrangle, and may include a pair of first ends 31a1 disposed at one end and a pair of second ends 31a2 disposed at the other end. The pair of second ends 31a2 may connect the first ends 31a1 and face each other.

Thus, when the first plate 31a according to the present exemplary embodiment is installed in the inlet portion of the opening 25, the first ends 31a1 of the first plate 31a may be installed in the first coupling portions 23a of the first sidewall 23 of the case 20.

In addition, the second ends 31a2 of the first plate 31a according to the present exemplary embodiment may be installed in the second coupling portions 24a of the second sidewall of the case 20.

According to the present exemplary embodiment, the length L3 and the width W3 of the first plate 31a may be smaller than the length L1 and the width W1 of the case 20, and therefore the first ends 31a1 and the second ends 31a1 of the first cap plate 31a may be partially installed in the first and second coupling portions 23a and 24a of the first and second sidewalls 23 and 24 of the case 24, respectively.

Thus, the first plate 31a may be coupled to the periphery area of the opening 25 of the case 20 by forming welding beads between portions in the first and second coupling portions 23a and 24a of the first and second sidewalls 23 and 24 of the case 20, in which the first and second ends 31a1 and 31a2 of the first plate 31a are not provided and the first and second ends 31a and 31a2 of the first plate 31a.

Hereinafter, a welding bead portion formed in the first and second sidewalls 23 and 24 of the case 20 will be described in further detail.

Figure 3:
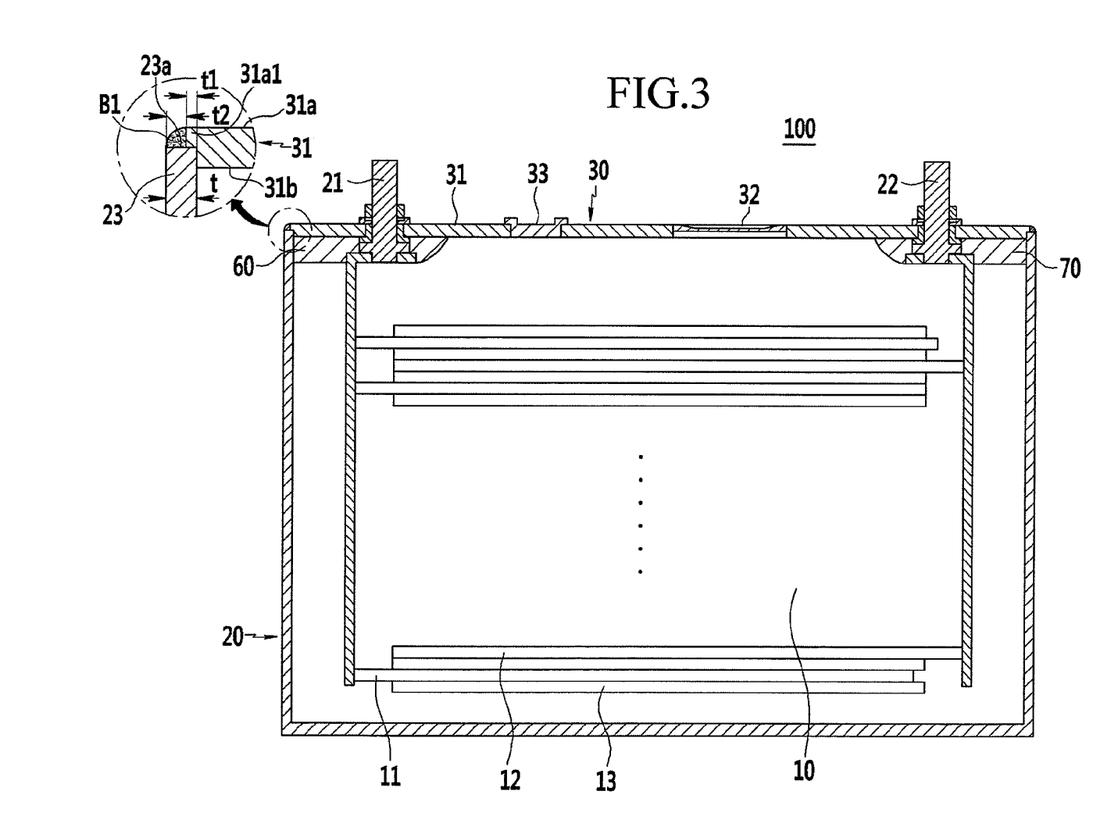
FIG. 3 illustrates a cross-sectional view of the rechargeable battery of FIG. 1, taken along the line III-III.
Figure 4:
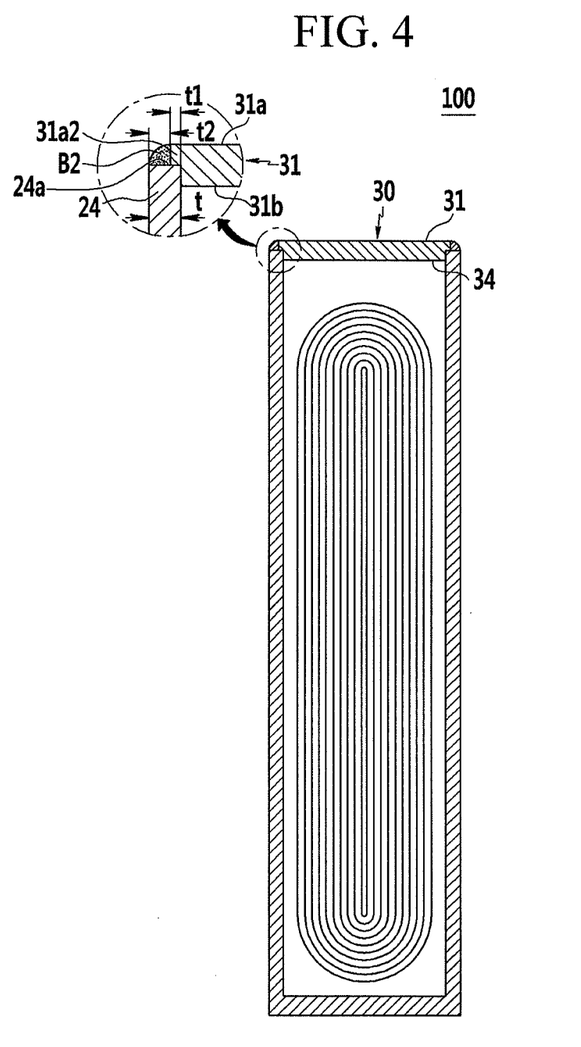
FIG. 4 illustrates a cross-sectional view of the rechargeable battery of FIG. 1, taken along the line IV-IV.

FIG. 3 illustrates a cross-sectional view of the rechargeable battery of FIG. 1, taken along the line and FIG. 4 illustrates a cross-sectional view of the rechargeable battery of FIG. 1, taken along the line IV-IV.

As shown in FIG. 3, the electrode assembly 10 according to the present exemplary embodiment may be formed by disposing a separator 13, which is an insulator, between the positive electrode 11 and the negative electrode 12 and winding the positive electrode 11, the negative electrode 13, and the separator 13 together.

Referring to FIG. 3, the first end 31a1 of the first plate 31a may be provided in a portion of the first coupling portion 23a of the first sidewall 23 according to the present exemplary embodiment.

In further detail, a thickness t of the first sidewall 23 of the case 20 according to the present exemplary embodiment may include a first thickness portion t1 and a second thickness portion t2.

The thickness of the first thickness portion t1 of the first sidewall 23 according to the present exemplary embodiment may be equivalent to the length of the first end 31a1 of the first plate 31a provided in the first coupling portion 23a of the first sidewall 23.

According to the present exemplary embodiment, the length of the first end 31a1 of the first plate 31a provided in the first coupling portion 23a may be equivalent to the thickness of the first thickness t1 of the first sidewall 23.

In addition, the length of a portion where the first plate 31a of the first coupling portion 23a is not provided may be equivalent to the thickness of the second thickness portion t2 of the first sidewall 23.

Thus, according to the present exemplary embodiment, a first welding bead portion B1 may be formed in a portion that corresponds to the second thickness portion t2 of the first sidewall 23 of the case 20.

In this case, the thickness of the first welding bead portion B1 according to the present exemplary embodiment may be equivalent to the thickness of the second thickness portion t2 of the first sidewall 23.

The second thickness portion t2 of the first sidewall 23 according to the present exemplary embodiment may be, for example, 0.6 times the thickness t of the first sidewall 23.

Thus, the thickness of the first welding bead portion B1 according to the present exemplary embodiment may be 0.6 t, which is substantially 0.6 times the thickness t of the first sidewall 23.

According to the present exemplary embodiment, the first plate 31a may be coupled to the periphery area of the opening 25 of the case 20 by forming a welding bead.

The first plate 31a may be coupled by welding to the first sidewall 23 of the case 20 by forming the welding bead between the first end 31a1 of the first plate 31a and a portion in the first coupling portion 23a of the first sidewall 23 of the case 20 in which the first end 31a1 is not provided, that is, a portion where the second thickness portion t2 of the first sidewall 23 is provided. An end surface of the first end 31a1 of the first plate 31a may extend from at least the top surface of the sidewall 23 and the upper surface of the first plate 31a and may form a non-oblique angle relative to the top surface of the sidewall 23. The end surface may define a niche that receives and contains the welding bead.

According to the present exemplary embodiment, the first welding bead portion B1 may be formed in the portion where the first end 31a1 of the first plate 31a is not provided, that is, the portion where the second thickness portion t2 of the first sidewall 23 is provided.

The first welding bead portion B1 according to the present exemplary embodiment may be formed in the second thickness portion t2 of the first sidewall 23. Accordingly, the first welding bead portion B1 may not protrude over the first sidewall 23 of the case 20.

According to the present exemplary embodiment, the entire length L of the case 20 may not be changed even through the first welding bead portion B1 is formed in the first coupling portion 23a of the first sidewall 23.

Referring to FIG. 4, the second end 31a2 of the first plate 31a may be provided in one portion of the second coupling portion 24a of the second sidewall 24.

The thickness t of the second sidewall 24 of the case 20 according to the present exemplary embodiment may include the first thickness portion t1 and the second thickness portion t2.

Here, the thickness of the first thickness portion t1 of the second sidewall 24 may be equivalent to the length of the second end 31a2 of the first plate 31a provided in the second coupling portion 24a of the second sidewall 24.

Thus, according to the present exemplary embodiment, the length of the second end 31a2 of the first plate 31a provided in the second coupling portion 24a may be equivalent to the thickness of the first thickness portion t1 of the second sidewall 24.

In addition, according to the present exemplary embodiment, a length of the portion where the first plate 31a of the second coupling portion 24a is not provided may be equivalent to the thickness of the second thickness portion t2 of the second sidewall 24.

Thus, a second welding bead portion B2 may be formed contacting the first plate 31a and the sidewall 24 in a portion corresponding to the second thickness portion t2 of the second sidewall 24 of the case 20 according to the present exemplary embodiment.

In this case, the thickness of the second welding bead portion B2 according to the present exemplary embodiment may be equivalent to the thickness of the second thickness portion t2 of the second sidewall 24.

In addition, the thickness of the second thickness portion t2 of the second sidewall 24 may be, for example, 0.6 times the thickness t of the second sidewall 24.

The thickness of the second welding bead portion B2 may be 0.6 t, that is, substantially 0.6 times the thickness t of the second sidewall 24 according to the present exemplary embodiment.

The first plate 31a may be coupled to the periphery area of the opening 25 of the case 20 by forming the welding bead according to the present exemplary embodiment.

The welding bead may be formed at a portion between and contacting the second end 31a2 of the first plate 31a and a portion of the second coupling portion 24a of the second sidewall 24 of the case 20 in which the second end 31a2 of the first plate 31a is not provided, that is, a portion where the second thickness portion t2 of the second sidewall 24 is provided, to couple the first plate 31a to the second sidewall 24 of the case 20 by welding.

According to the present exemplary embodiment, the second welding portion B2 may be formed in the portion where the second thickness portion t2 of the second sidewall 24 is provided, that is, the portion where the second end 31a2 of the first plate 31a is not provided.

The second welding bead portion B2 may be formed in the second thickness portion t2 of the second sidewall 24. Accordingly, the second welding bead portion B2 may not protrude over the second sidewall 24 of the case 20.

The entire width W1 of the case 20 may not be changed even through the second bead portion B2 is formed in the second coupling portion 24a of the second sidewall 24.

According to the present exemplary embodiment, the welding bead portions B1 and B2 formed between the case 20 and the cap plate 31 may be prevented from protruding over the length L1 and the width W1 of the case 20 in the directions of the length L1 and the width W1 of the case 20.

Accordingly, the rechargeable battery 100 according to the present exemplary embodiment may be prevented from being increased in volume by the welding beads formed in welding-coupling of the case 20 and the cap plate 31.

In addition, according to the present exemplary embodiment, the welding bead formed when the case 20 and the cap plate 31 are coupled by welding is not electrically connected with another adjacent rechargeable battery, an internal short-circuit in the rechargeable battery 100 may be prevented.

Figure 5:
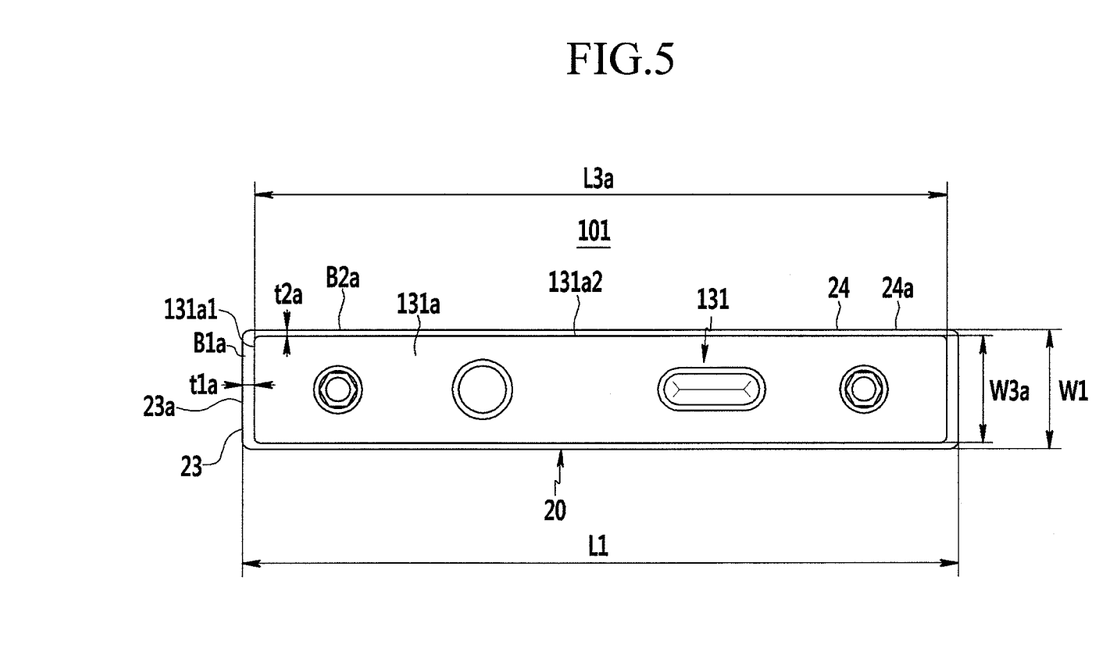
FIG. 5 illustrates a top plan view of a rechargeable battery according to a variation of the exemplary embodiment illustrated in FIG. 1.

FIG. 5 illustrates a top plan view of a rechargeable battery according to an exemplary variation of the present exemplary embodiment.

Referring to FIG. 5, a rechargeable battery 101 according to the present exemplary embodiment may be the same as the rechargeable battery 100 according to the first exemplary embodiment, excluding a cap plate 131. Therefore descriptions of the similar structures of the rechargeable battery 100 will not be repeated.

A first plate 131a of the cap plate 131 according to the present exemplary embodiment may include a pair of first ends 131a1 disposed at one direction and a pair of second ends 131a2 disposed at the other direction and connecting the first ends 131a1. The first ends 131a1 and the second ends 131a2 may be disposed in the shape of a quadrangle.

In addition, in the present exemplary embodiment, a length L3a and a width W3a of the first plate 131a of the cap plate 131 may be smaller than a length L1 and a width W1 of a case 20.

Thus, when the first plate 131a according to the present exemplary embodiment is provided in an inlet of an opening, the first end 131a1 of the first plate 131a may be provided in a first coupling portion 23a of a first sidewall 23 of the case.

In addition, the second ends 131a2 may be provided in a second coupling portion 24a of a second sidewall 24 of the case according to the present exemplary embodiment.

In this case, according to the present exemplary embodiment, the length L3a and the width W3a of the first plate 131a may be smaller than the length L1 and the width W1 of the case 20. Accordingly, the first ends 131a1 and the second ends 131a2 of the first plate 131a may be respectively provided in parts of the first and second coupling portions 23a and 24a of the first and second sidewalls 23 and 24.

According to the present exemplary embodiment, a first welding bead portion B1a may be formed in a portion in the first coupling portion 23a of the first sidewall 23, in which the first end 131a1 of the first plate 131a is not formed.

In addition, a second welding bead portion B2a may be formed in a portion in the second coupling portion 24a of the second sidewall 24, in which the second end 131a2 of the first plate 131a is not formed.

A thickness t1a of the first welding bead portion B1a formed in the first coupling portion 23a of the first sidewall 23 may be thicker than a thickness t2a of the second welding bead portion B2a formed in the second coupling portion 24a of the second sidewall 24.

For example, when the first sidewall 23 and the second sidewall 24 according to the present exemplary embodiment have the same thickness t1, the thickness t2a of the second welding bead portion B2a may be 0.6 times the thickness t of the first and second sidewalls 23 and 24 and the thickness t1a of the first welding bead portion B1a may be 0.7 times to 0.9 times the thickness t of the first and second sidewalls 23 and 24.

The first ends 131a1 of the first plate 131a according to the present exemplary embodiment correspond to short sides of the rectangle-shaped first plate 131a and the second ends 131a2 correspond to the long sides of the rectangle-shaped first plate 131a.

Thus, an area where the first welding bead portion B1a can be formed in the first coupling portion 23a of the first sidewall 23 of the case 20 may be relatively smaller than an area where the second welding bead portion B2a can be formed in the second coupling portion 24a of the second sidewall 24 of the case 20.

The thickness t1a of the first welding bead portion B1a may be thicker than the thickness t2a of the second welding bead portion B2a Accordingly, the coupling strength of the first plate 131a and the case 20 may be comparatively uniformly maintained through the long and short sides of the rectangle-shaped first plate 131a.

Figure 6:
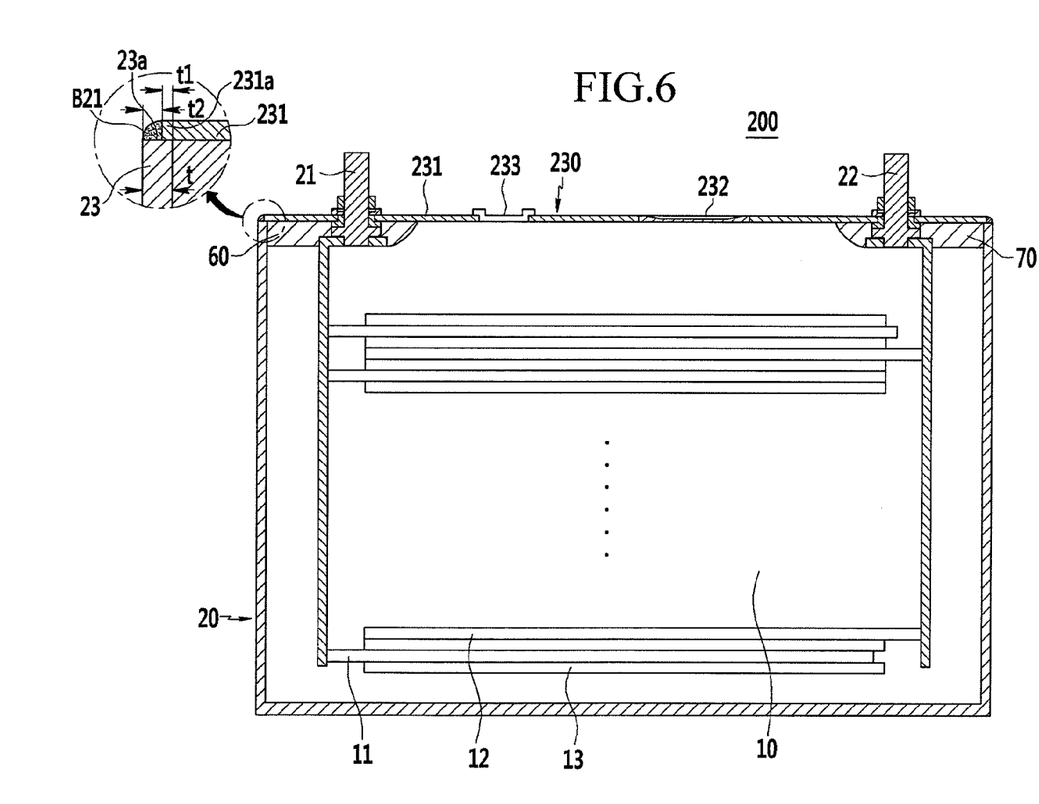
FIG. 6 illustrates a cross-sectional view of a rechargeable battery, seen from the front, according to another exemplary embodiment.
Figure 7:
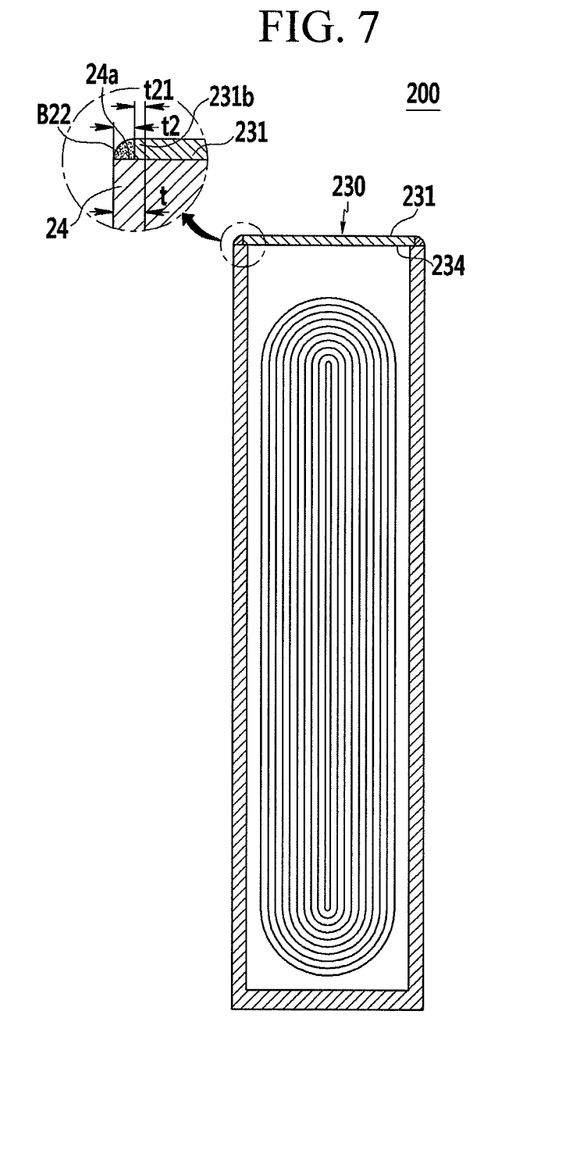
FIG. 7 illustrates a cross-sectional view of the rechargeable battery, seen from a side, according to the exemplary embodiment of FIG. 6.

FIG. 6 illustrates a cross-sectional view of a rechargeable battery according to another exemplary embodiment, viewed from a front direction, and FIG. 7 illustrates a cross-sectional view of the rechargeable battery according to this exemplary embodiment, viewed from a side direction.

Referring to FIG. 6 and FIG. 7, a rechargeable battery 200 according to the present exemplary embodiment is the same as the rechargeable battery 100 according to the exemplary embodiment illustrated in FIGS. 1 to 5, except for a structure of a cap assembly 230. Therefore, descriptions of similar structures will not be repeated.

The cap assembly 230 according to the present exemplary embodiment may include a cap plate 231 covering an opening of the case 20, a vent portion 232 where a notch is formed, and an electrolyte injection opening 233.

In addition, the cap plate 231 according to the present exemplary embodiment may be coupled to an inlet portion of the opening of the case 20.

In further detail, the rectangle-shaped first plate 231 according to the present exemplary embodiment may include a pair of first ends 231a disposed in one direction and a pair of second ends 231b disposed in another direction. The second ends 231b may connect the first ends 231a and may be disposed to face each other.

Thus, when the cap plate 231 is provided in an inlet of an opening, the first ends 231a of the cap plate 231 may be provided in a first coupling portion 23a of a first sidewall 23 of the case 20.

In addition, the second ends 231b of the cap plate 231 according to the present exemplary embodiment may be provided in a second coupling portion 24a of a second sidewall 24 of the case 20.

Thus, the cap plate 231 may be coupled to the periphery area of an opening 25 of the case 20 by welding beads between portions of the first and second coupling portions 23a and 24a of the first and second sidewalls 23 and 24 of the case 20, in which the first and second ends 231a and 231b are not provided and the first and second ends 231a and 231b of the cap plate 231.

In further detail, a thickness t of the first sidewall 23 of the case 20 may include a first thickness portion t1 and a second thickness portion t2 according to the present exemplary embodiment.

The thickness of the first thickness portion t1 of the first sidewall 23 according to the present exemplary embodiment may be equivalent to the length of the first ends 231a of the cap plate 231 provided in the first coupling portion 23a of the first sidewall 23.

Thus, the length of the first end 231a of the cap plate 231 provided in the first coupling portion 23a of the first sidewall 23 may be equivalent to the thickness of the first thickness portion t1 of the first sidewall 23 according to the present exemplary embodiment.

In addition, the length of the portion where the cap plate 231 of the first coupling portion 23a is not provided may be equivalent to the thickness of the second thickness portion t2 of the first sidewall 23 according to the present exemplary embodiment.

Thus, according to the present exemplary embodiment, a first welding bead portion B21 may be formed in a portion that corresponds to the second thickness portion t2 of the first sidewall 23 of the case 20.

In this case, the thickness of the first welding bead portion B21 may be equivalent to the thickness of the second thickness portion t2 of the first sidewall 23.

Further, the thickness of the second thickness portion t2 of the first sidewall 23 may be, for example, 0.6 times the thickness t of the first sidewall 23.

Thus, the thickness of the first welding bead portion B21 according to the present exemplary embodiment may be 0.6 t, that is, substantially 0.6 times the thickness t of the first sidewall 23.

The first welding bead portion B21 may be formed in the second thickness portion t2 of the first sidewall. Accordingly, the first welding bead portion B21 may not protrude over the first sidewall 23 of the case 20.

In addition, the second end 231b of the cap plate 231 may be provided in a portion of the second coupling portion 24a of the second sidewall 23 according to the present exemplary embodiment.

In further detail, the thickness t of the second sidewall 24 of the case 20 according to the present exemplary embodiment may include a first thickness portion t1 and a second thickness portion t2.

Here, the thickness of the first thickness portion t1 of the second sidewall 23 according to the present exemplary embodiment may be equivalent to the length of the second end 231b of the cap plate 231 provided in the second coupling portion 24a.

Thus, the length of the second end 231b of the cap plate 231 provided in the second coupling portion 23a of the second sidewall 24 may be equivalent to the thickness of the first thickness portion t1 of the second sidewall 23 according to the present exemplary embodiment.

In addition, the length of a portion where the cap plate 231 of the second coupling portion 24a is not provided may be equivalent to the thickness of the second thickness portion t2 of the second sidewall 24 according to the present exemplary embodiment.

A second welding bead portion B22 may be formed in a portion corresponding to the second thickness portion t2 of the second sidewall 24 of the case 20 according to the present exemplary embodiment.

In this case, according to the present exemplary embodiment, the thickness of the second welding bead portion B22 may be equivalent to the thickness of the second thickness portion t2 of the second sidewall 24.

Further, the thickness of the second thickness portion t2 of the second sidewall 24 according to the present exemplary embodiment may be, for example, 0.6 times the thickness t of the second sidewall 24.

Thus, the thickness of the second welding bead portion B22 according to the present exemplary embodiment may be 0.6 t, that is, substantially 0.6 times the thickness t of the second sidewall 24.

The second welding bead portion B22 may be formed in the second thickness portion t2 of the second sidewall 24 according to the present exemplary embodiment. Accordingly, the second welding bead portion B22 may not protrude over the second sidewall 24 of the case 20.

The case 20 may be prevented from being increased in volume by the welding beads formed in welding-coupling of the case 20 and the cap plate 231 in the rechargeable battery 200 according to the present exemplary embodiment.

In addition, according to the present exemplary embodiment, because the welding bead formed when the case 20 and the cap plate 231 are coupled by welding is not electrically connected with another adjacent rechargeable battery, an internal short-circuit in the rechargeable battery 100 may be prevented.

Figure 8:
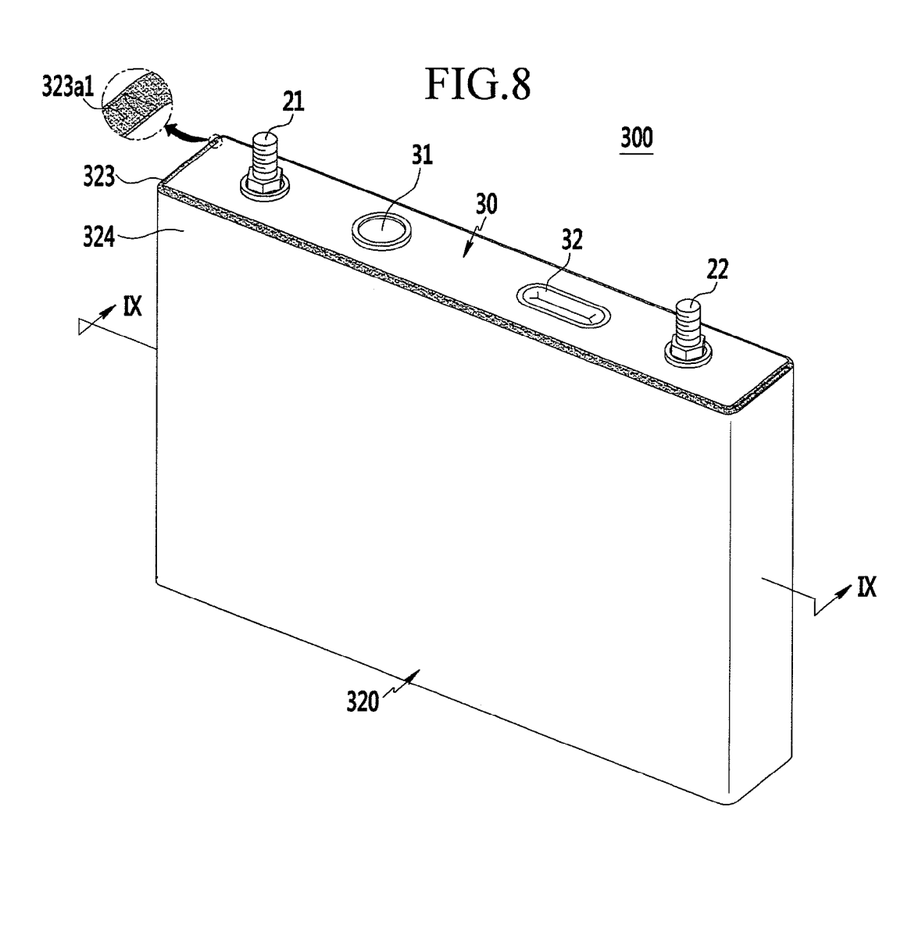
FIG. 8 illustrates a perspective view of a rechargeable battery according to another exemplary embodiment.
Figure 9:
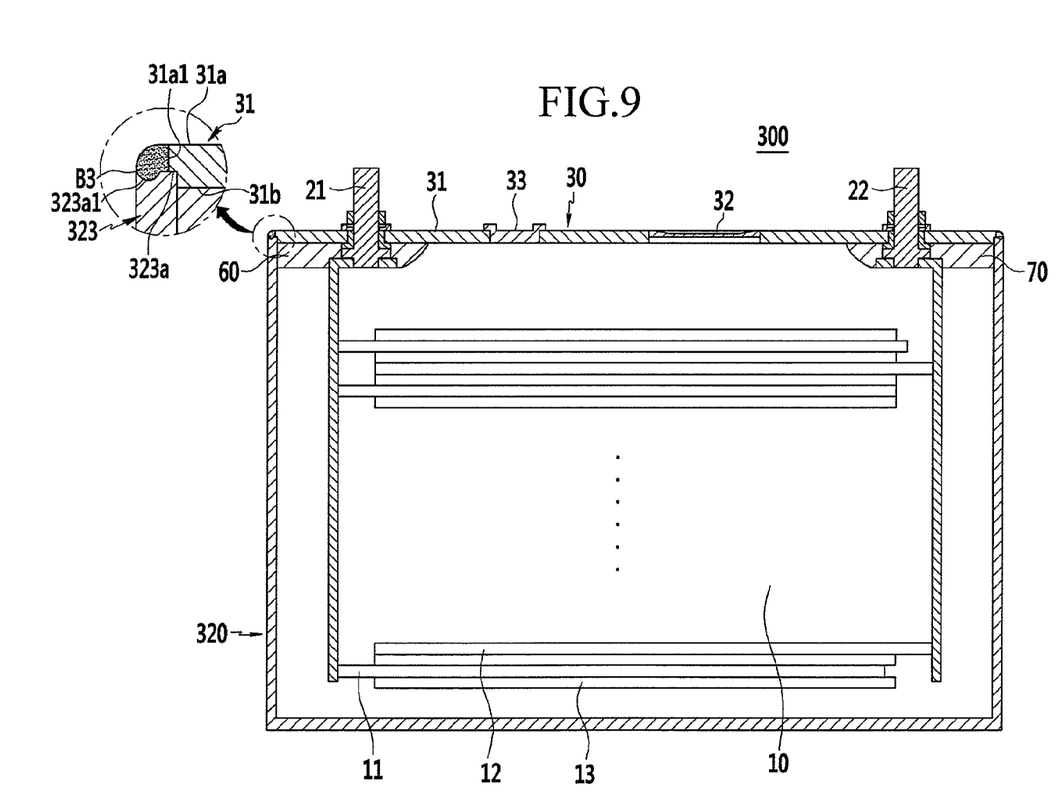
FIG. 9 illustrates a cross-sectional view of the rechargeable battery of FIG. 8, taken along the line VIIII-VIIII.

FIG. 8 illustrates a perspective view of a rechargeable battery according to another exemplary embodiment and FIG. 9 is a cross-sectional view of the rechargeable battery of FIG. 8, taken along the line VIIII-VIIII.

Referring to FIG. 8 and FIG. 9, a rechargeable battery 300 according to the this exemplary embodiment includes the same configuration of the rechargeable battery 100 according to the exemplary embodiment of FIGS. 1 to 5, except for a structure of a case 320. Therefore, descriptions of configurations of the rechargeable battery 300 that are equivalent or similar to the configuration of the rechargeable battery 100 will not be repeated.

The case 320 according to the present exemplary embodiment may be formed in the shape of a prism, and may include a pair of first sidewalls 232 facing each other and a pair of second sidewalls 324 connecting the pair of first sidewalls 323 and facing each other.

The first sidewall 323 and the second sidewall 324 of the case 320 according to the present exemplary embodiment may respectively include a first coupling portion 323a and a second coupling portion (not shown) to which the cap plate 31 is coupled.

The second coupling portion (not shown) of the second sidewall 324 of the case 320 according to the present exemplary embodiment may be the same as the second coupling portion 24a of the second sidewall 24 of the case 20 according to the exemplary embodiment of FIGS. 1 to 5, and therefore, a description thereof will not be repeated.

A groove portion 323a1 may be formed along a width direction of the case 320 in the first coupling portion 323a of the first sidewall 323 of the case 320 according to the present exemplary embodiment.

According to the present exemplary embodiment, a first welding bead portion B3 that contacts and connects the first plate 31a and the first coupling portion 323a of the case 320 may be formed over the groove portion 323a1 formed in the first coupling portion 323a and other portions of the first coupling portion 323a.

The area and the thickness of the first welding bead portion B3 may be increased due to the groove portion formed in the first coupling portion 323a. Accordingly, the first plate 31a may be firmly coupled to the case 320 by the first welding bead portion B3.

By way of summation and review, an electrode assembly may be installed in the case of a rechargeable battery, and a cap plate is coupled to an opening of the case such that the case is closed and sealed. The cap plate and the case may be coupled by welding beads between the cap plate and the opening of the case.

However, when a welding bead used in coupling of the cap plate and the case through bead-welding is formed between the cap plate and the opening of the case, a constant amount of the welding bead may be present to weld the cap plate and the opening of the case but a remaining portion of the welding bead may protrude such that a protruding portion may be formed between the opening of the case and the cap plate. Thus, the volume of the rechargeable battery may be increased due to the protruding portion formed in the opening of the case.

When the protruding portion formed in the opening of the case is increased more than a predetermined size, the rechargeable battery having the protruding portion formed therein may contact an adjacent rechargeable battery of a battery module such that a short-circuit may occur.

Embodiments may provide an improved coupling structure of a cap plate and a case.

Embodiments may provide a rechargeable battery having a structure that may prevent a protruding portion from being formed between a cap plate and an opening of a case by a welding bead. An increase of the volume of the case can be prevented by a welding bead formed in coupling by welding of the case and the cap plate Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope as set forth in the following claims.

What is claimed is:

1. A battery, including:
a case accommodating an electrode assembly, the case including an opening at one end and including at least one sidewall, the sidewall having a coupling portion adjacent to the opening;
a cap plate that closes the opening, the cap plate having an upper surface, the coupling portion of the sidewall connecting the cap plate to the case, the coupling portion including a top surface of the sidewall, the cap plate overlying a first portion of the top surface of the sidewall, such that the upper surface of the cap plate is entirely above the top surface of the sidewall; and
a welding bead contacting the cap plate and entirely covering only a second portion of the top surface of the sidewall and a side surface of the cap plate, the second portion of the top surface extending from the first portion to an outer surface of the sidewall.

2. The battery as claimed in claim 1, wherein a width of second portion of the top surface in a thickness direction of the sidewall is about 0.6 times a total width of the top surface in the thickness direction, the thickness direction being a direction perpendicular to the outer surface of the sidewall.

3. The battery as claimed in claim 1, wherein the cap plate further includes a protruding portion that protrudes into the opening of the case.

4. The battery as claimed in claim 3, wherein the protruding portion includes a side surface that contacts an inner surface of the sidewall.

5. The battery as claimed in claim 1, wherein:
the second portion of the top surface of the sidewall includes a groove, and
the welding bead fills the groove.

6. The battery as claimed in claim 1, wherein:
the cap plate includes an end surface forming a non-oblique angle relative to the top surface of the sidewall and extending between at least the top surface of the sidewall and the upper surface of the cap plate, such that the end surface defines a niche, the niche extending along a side of the opening, and
the niche receives and contains the welding bead.

7. The battery as claimed in claim 6, wherein the end surface of the cap plate is perpendicular to the top surface of the sidewall.

8. The battery as claimed in claim 6, wherein:
the end surface is a first end surface, and is parallel to a short side of the case, and
the cap plate further includes a second end surface that is parallel to a long side of the case.

9. The battery as claimed in claim 6, wherein:
the sidewall includes a plurality of sidewalls providing a plurality of top surfaces surrounding the opening, first portions of the top surfaces defining an innermost perimeter of the top surfaces and second portions of the top surfaces defining an outermost perimeter of the top surfaces,
the cap plate covers the innermost perimeter defined by the top surfaces surrounding the opening,
the end surface of the cap plate includes a plurality of end surfaces each extending perpendicularly to the top surface of a respective sidewall at least between the top surface of the respective sidewall and the upper surface of the cap plate, such that the end surfaces define the niche that receives and contains the welding bead, the niche extending around the opening.

10. The battery as claimed in claim 9, wherein:
the case has a prismatic shape defining a length direction, a width direction, and a height direction,
the plurality of sidewalls include short sidewalls facing each other and extending in the width and height directions and long sidewalls facing each other and extending in the length and height directions, such that the opening has a rectangular shape in the length and width directions, the short sidewalls having short sidewall top surfaces and the long sidewalls having long sidewall top surfaces,
the cap plate has a rectangular shape in the length and width directions and partially covers the short sidewall top surfaces and the long sidewall top surfaces.

11. The battery as claimed in claim 10, wherein:
a length of the cap plate is less than a length of the case,
the length of the cap plate is greater than a length of the opening,
a width of the cap plate is less than a width of the case,
the width of the cap plate is greater than a width of the opening.

12. The battery as claimed in claim 10, wherein:
a width of the short sidewall top surfaces in a thickness direction of the short sidewalls is equal to a width of the long sidewall top surfaces in a thickness direction of the long sidewalls, the thickness direction of the short sidewalls being a direction perpendicular to an outer surface of the short side walls, and the thickness direction of the long sidewalls being a direction perpendicular to an outer surface of the long sidewalls, and
a width of the second portion of the short sidewall top surfaces in the thickness direction of the short sidewalls is greater than a width of second portion of the long sidewall top surfaces in the thickness direction of the long sidewalls.

13. The battery as claimed in claim 12, wherein:
the width of the second portion of the short sidewall top surfaces in a thickness direction of the short sidewalls is about 0.7 to about 0.9 times a total width of the short sidewall top surfaces, and
a width of the second portion of the long sidewall top surfaces in a thickness direction of the long sidewalls is about 0.6 times a total width of the long sidewall top surfaces.

14. The battery as claimed in claim 10, wherein:
the cap plate includes short end surfaces extending perpendicularly to the short sidewall top surfaces between at least the short sidewall top surface and the upper surface of the cap plate and long end surfaces extending perpendicularly to the long sidewall top surfaces between at least the long sidewall top surface and the upper surface of the cap plate.

15. The battery as claimed in claim 10, wherein:
the second portions of the top surfaces of the short sidewalls include a groove extending in the width direction of the case, and
the welding bead fills the groove.

16. The battery as claimed in claim 10, wherein the cap plate further includes a protruding portion that protrudes into the opening of the case, the protruding portion having a rectangular shape in the length and width directions.

17. The battery as claimed in claim 16, wherein:
the protruding portion includes side surfaces,
a length of the protruding portion is about equal to a length of the opening, and
a width of the protruding portion is about equal to a width of the opening, such that the side surfaces of the protruding portion tightly contact inner surfaces of the short sidewalls and the long sidewalls.

18. The battery as claimed in claim 1, further including positive and negative terminals electrically connected to the electrode assembly and extending to the exterior of the battery through the cap plate.

* * * * *